Patented June 6, 1944

2,350,801

UNITED STATES PATENT OFFICE 2,350,801

SEED CULTIVATION

Béla Németh, Keszthely, Hungary; vested in the Alien Property Custodian

No Drawing. Application March 8, 1941, Serial No. 382,458. In Hungary March 9, 1940

3 Claims. (Cl. 47—58)

The invention relates to improved cold resistant beet seeds and method of obtaining them from beet seed of swede, fodder-sugar-beets, red beets and the like, the primary object of the invention being to eliminate the work and expense of removing the seedlings at the onset of winter and the replanting thereof in the spring which is ordinarily necessary in the case of seeds planted in the late summer or in the autumn.

Other important objects of the invention are to provide for the growing of beets and beet seeds on a much smaller acreage than is usually required, and to produce beet plants which are more resistant to root and other common diseases.

The present invention results in part from the discovery that beet seed and seedlings which have a relatively high content of dry substance, such as sugar, protein, etc., are substantially winterproof, especially when protected from the sudden and wide variations in temperature which occur in the wintertime.

Accordingly, in an illustrative embodiment of the invention, special beet seeds are procured ready or are obtained by selective culture over several generations, which exhibit a dry substance content of say, from 2 to 4 percent higher than that of ordinary beet seeds.

The special beet seeds are sown in the late summer, between the middle of August and the middle of September, by drilling them in a groove formed in any desired manner in the bottom of a furrow deep enough so that the seed and the resultant seedling which grows therefrom are shielded by the sides of the furrow from direct sunlight as well as from cold winds. It is to be noted that whereas in ordinary beet seed sowing the rows are required to be spaced at a distance of from 20 to 30 inches apart and the seeds are required to be spaced at from 20 to 30 inches apart, the special beet seeds herein disclosed require a row spacing of only about 16 inches and a plant spacing of from 6 to 8 inches. As a result of these reductions in spacing the area required according to the present invention is only about half of that usually required, for growing beets or seed.

In addition, whereas ordinarily from 50 to 90 units of mother-seed or seedling per acre are required for late summer planting only about 32 units of the special seed herein disclosed are required. Further, the yield per acre is increased more than double the average yield.

It is usually necessary and always advisable as additional positive protection against the destructive effects of the sudden temperature changes of winter, that the seeds be covered with earth and the like before the onset of the winter frosts. This can be done manually, but it will usually be found that the autumnal rains will have washed sufficient earth over the seeds from the walls of the furrow to cover the seeds effectively.

Adequate covering of the seeds having been seen to, the seeds are left in place until the advent of spring, when the growing seedlings are thinned to a spacing of from 15 to 20 inches.

From this point until maturity and thereafter the plants are cultivated as in ordinary beet raising, and allowed to go to seed, which takes place in July or August. Because the seedlings do not sprout many branches under the conditions of their growth and cultivation, the seeds are unobscured and as a result ripen uniformly and can be harvested all at the same time.

The new seed being harvested is then kept until the following spring, when it is sown, preferably in March. The beets grown from this sowing are fully developed by the following October.

It will appear from the foregoing that the new seed which is obtained by applicant is obtained directly from the special seed by growing the same in the earth throughout the winter, by reason of which fact the labor, expense, and hazards of keeping and preserving seedlings in storage during the winter are eliminated, and that in addition other economies and gains are achieved by the invention.

I claim:

1. The method of growing a winterproof crop directly from beet seeds which comprises obtaining beet seeds characterized by unusually high content of dry substance by selective culture over several generations, sowing the seeds in the late summer in a furrow in the ground sufficiently deep to protect the seed from direct sunlight and cold winds, shielding the resultant seedlings in the autumn before the advent of the winter frost against the effects of the sudden variations in temperature characterizing the wintertime, and retaining the seedlings in the ground throughout the winter and until maturing of the seed crop.

2. The method of growing a winterproof crop of beet seeds which comprises obtaining seeds of relatively high dry substance content by selective culture over several generations, sowing the seeds in the ground in the late summer in the bottom of a groove sufficiently deep to protect the seed from direct sunlight and cold winds, then in the autumn shielding the resultant seedlings from the destructive sudden variations in temperature characteristic of the ensuing wintertime by covering the seed in the bottom of the groove with earth, and maintaining the seedlings in the ground throughout the winter and until the resultant plants go to seed.

3. The method of growing a crop of beets which comprises obtaining seeds of unusually high dry substance content by selective culture over several generations, sowing the seeds in the late summer in the bottom of a groove sufficiently deep to shield the seeds from direct sunlight and cold winds, then in the autumn shielding the resultant seedlings from the destructive sudden variations in temperature characteristic of the wintertime by covering the seedlings in the bottom of the groove with earth, maintaining the seedlings in the ground throughout the winter and until the plants go to seed, harvesting the seeds when ripe, and sowing the seeds thus obtained the following spring.

BÉLA NÉMETH.